(12) United States Patent
Miyata

(10) Patent No.: US 7,099,001 B2
(45) Date of Patent: Aug. 29, 2006

(54) AUTO-COLLIMATOR

(75) Inventor: Yasuhisa Miyata, Saitama-ken (JP)

(73) Assignees: Pioneer Corporation, Tokyo (JP); Pioneer FA Corporation, Saitama-ken (JP)

( * ) Notice: Subject to any disclaimer, the term of this patent is extended or adjusted under 35 U.S.C. 154(b) by 328 days.

(21) Appl. No.: 10/825,665

(22) Filed: Apr. 16, 2004

(65) Prior Publication Data

US 2004/0207835 A1   Oct. 21, 2004

(30) Foreign Application Priority Data

Apr. 18, 2003   (JP) .............................. 2003-114518

(51) Int. Cl.
*G01B 11/26* (2006.01)

(52) U.S. Cl. .................................. 356/154; 356/139.04

(58) Field of Classification Search ................ 356/154, 356/139.04, 153; 250/559.29, 559.3; 359/641
See application file for complete search history.

(56) References Cited

U.S. PATENT DOCUMENTS 5,144,479 A * 9/1992 Aharon et al. ............... 359/424
5,461,472 A * 10/1995 Harvey et al. ............... 356/138

FOREIGN PATENT DOCUMENTS

JP          55-25605          3/1975

* cited by examiner

*Primary Examiner*—Gregory J. Toatley, Jr.
*Assistant Examiner*—Roy M. Punnoose
(74) *Attorney, Agent, or Firm*—Arent Fox PLLC

(57) ABSTRACT

For detection of the inclination of the normal of a measurement-subject article, an auto-collimator applies a laser beam from a light source onto the measurement-subject article. Then, the return light reflected back from the measurement-subject article is concentrated by a convex lens. Further the return light is converted to parallel light by a concave lens and then projected onto a first screen. The auto-collimator is provided with a beam splitter provided between the convex lens and the concave lens for splitting off a portion of the return light traveling back from the measurement-subject article, and a coarse-adjustment verification screen for showing the split-off light split off from the return light by the beam splitter.

7 Claims, 3 Drawing Sheets

FIRST EMBODIMENT

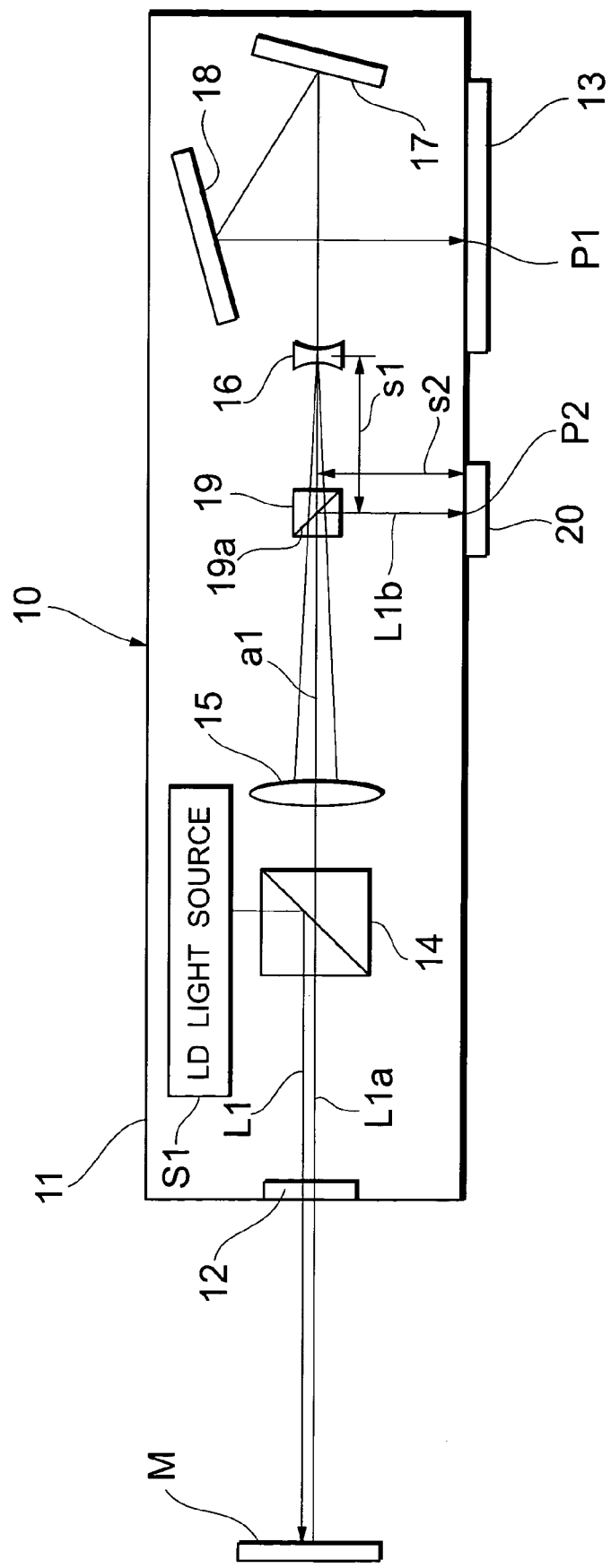
*Fig. 2* FIRST EMBODIMENT

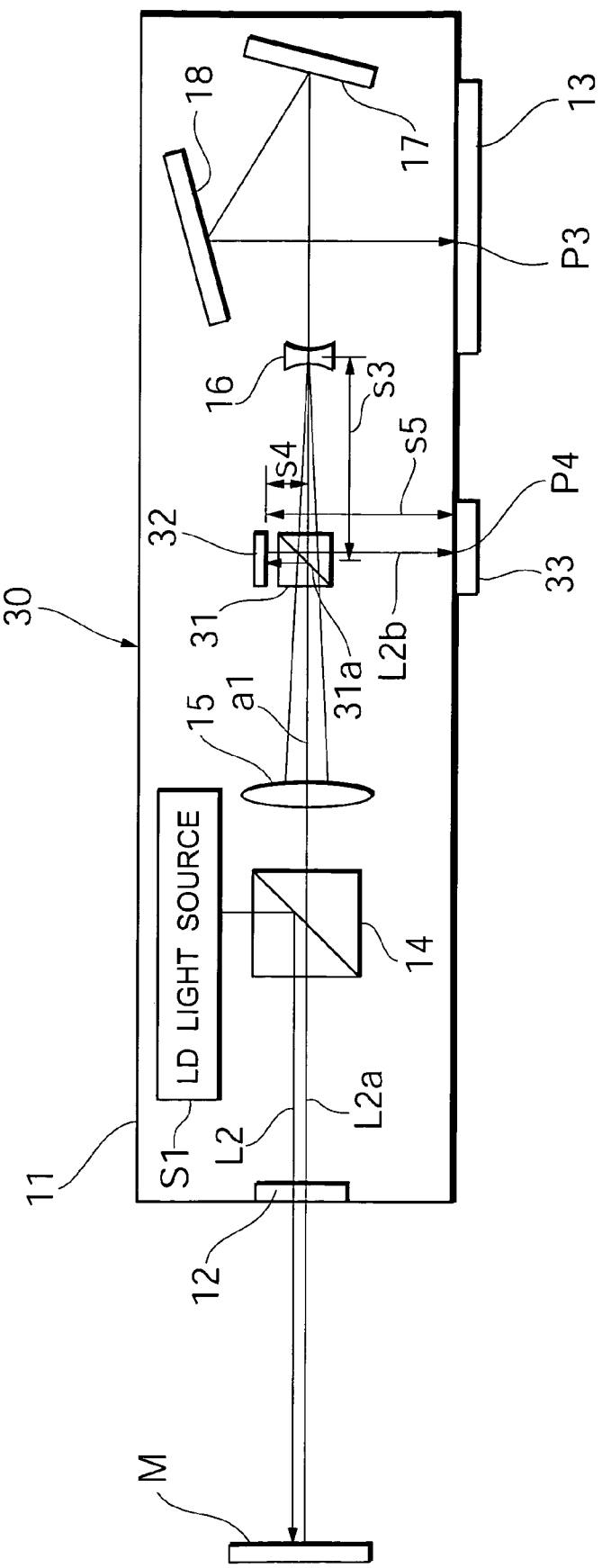
Fig.3 SECOND EMBODIMENT

AUTO-COLLIMATOR

BACKGROUND OF THE INVENTION

1. Field of the Invention

This invention relates to an auto-collimator.

The present application claims priority from Japanese Application No.2003-114518, the disclosure of which is incorporated herein by reference.

2. Description of the Related Art

Auto-collimators are used for various checks, tests, measurements, adjustments and regulations, e.g., a mounting check for optics such as a mirror, lens, prism and the like, a swinging or inclination check for a CD and a DVD, a mounting adjustment for the pickup of a CD apparatus or a DVD apparatus, an inclination adjustment of the optical axis in a laser diode (LD), an inclination check for a head of a hard disk drive (HDD), a measurement of parallelism between a charged-coupled device (CCD) and a cover glass, and measurements of inclination and parallelism for various planes such as in a surface plate, table, parts and the like.

FIG. 1 is a schematic block diagram of a conventional laser auto-collimator such as that described in Japan Examined Patent Publication No. 55-25605.

In FIG. 1, the auto-collimator 1 has a cover glass 3 fitted into an opening formed in the face at one end (the left-hand end in FIG. 1) of an approximately box-shaped casing 2, and a verification screen 4 attached to another opening formed in a side face close to the other end (the right-hand end in FIG. 1) of the casing 2.

The casing 2 houses a beam splitter 5, a convex lens 6 and a concave lens 7 fastened in this order from the cover glass 3 in mutually coaxial positions along an axis a parallel to the axis of the casing 2.

The concave lens 7 is situated in a position corresponding to the focal point of the convex lens 6.

A first reflection mirror 8 is fixed in a position intersecting with the axis a in the end portion of the casing 2 in the proximity of the verification screen 4 in such a way that the normal of the first reflection mirror 8 is inclined toward the opposite side from the verification screen 4 with respect to the axis a. Further, a second reflection mirror 9 is fixed opposite to the verification screen 4 in such a way as to be inclined toward the first reflection mirror 8 with respect to the normal of the verification screen 4.

The inclination angles of the normals of the first reflection mirror 8 and the second reflection mirror 9 are determined respectively at angles allowing the light passing from the cover glass 3 through the beam splitter 5, convex lens 6 and concave lens 7 to be reflected by the first reflection mirror 8 and the second reflection mirror 9 in order to enter the verification screen 4, which will be described later.

A light source S having a laser diode is mounted opposite the beam splitter 5 inside the casing 2 and oriented to apply and position a laser beam L onto the beam splitter 5.

In the auto-collimator 1, a laser beam L emitted from the light source S is reflected at right angles by the beam splitter 5, and then passes through the cover glass 3 to be irradiated onto a measurement-subject article M.

The measurement-subject article M reflects the laser beam L to produce a return light La which passes through the cover glass 3 to the inside of the casing 2. The return light La passes through the beam splitter 5, is then concentrated by the convex lens 6 and is then converted to parallel light by the concave lens 7.

When the normal of the measurement-subject article M is tilted (deflected) with respect to the axis a, a deflection occurs in the return light La. When this return light La is converted to parallel light by the concave lens 7, the deflection is increased.

Then the return light La passing through the concave lens 7 is reflected by the first reflection mirror 8 and then the second reflection mirror 9, and is then projected onto the verification screen 4.

The verification screen 4 displays the center point and a scale showing the degree of deflection from the center point. The center point is set at a light spot P produced by the return light La when no deflection occurs in the normal of the measurement-subject article M.

Accordingly, when deflection occurs in the normal of the measurement-subject article M due to mounting conditions or the like, the light spot P of the return light La appears in a position deviating from the center point of the verification screen 4, whereby the operator is able to detect the deflection of the normal of the measurement-subject article M.

The conventional auto-collimator 1 having the structure as described above uses two mirrors, the first reflection mirror 8 and the second reflection mirror 9. Therefore, the light path of the return light La from the concave lens 7 to the verification screen 4 is extended as compared with the case where the return light La directly enters the verification screen from the concave lens 7. Thereby, the deflection of the return light La is further increased. As a result, it is possible to detect the mounting conditions of the measurement-object article M with high accuracy.

However, when the deflection of a return light La is increased in this manner for an enhancement in accuracy of detection of the auto-collimator 1, even a slight deflection of the normal of a measurement-object article M causes the light spot P of the return light La to fall outside the verification screen 4, resulting in the problem of uncertainty about the direction in which to adjust the mounting position of the measurement-subject article M.

SUMMARY OF THE INVENTION

The present invention is mainly designed to solve the problem associated with the conventional auto-collimator as described above.

It therefore is an object of the present invention to provide an auto-collimator capable of performing a coarse adjustment and a fine adjustment to the inclination of the normal of a measurement-subject article.

To attain this object, the present invention provides an auto-collimator that applies light from a light source onto a measurement-subject article, then concentrates the return light reflected back from the measurement-subject article by a convex lens, then converts the return light to parallel light by a concave lens, and then projects the return light onto a first screen for detection of inclination of the normal of the measurement-subject article. The auto-collimator comprises an optical splitting element provided between the convex lens and the concave lens for splitting off a portion of the return light travelling back from the measurement-subject article, and a second screen for showing the split-off light split off by the optical splitting element.

In the auto-collimator according to the present invention, the light emitted from the light source is irradiated onto a measurement-subject article, and the return light reflected from the measurement-subject article is concentrated by the convex lens, is then converted to parallel light by the concave lens, and then enters the first screen.

In this case, if the normal of the measurement-subject article is inclined, the return light is deflected. Therefore, when this return light is converted to the parallel light by the concave lens, the deflection is increased.

Due to this increase in the deflection, the light spot of the return light projected onto the first screen after passing through the concave lens is shown in a position deviating from a position of a light spot projected on the first screen when the return light travels back without deflection, in correspondence with the degree of inclination of the normal of the measurement-subject article.

Accordingly the operator is able to visually verify the position of the light spot of the return light on the first screen for detection of the inclination (deflection) of the normal of the measurement-subject article.

In this case, the light spot produced from the return light with the increased deflection is shown on the first screen. Therefore, it is possible to detect and finely adjust the inclination of the normal of the measurement-subject article with accuracy.

The auto-collimator further uses the optical splitting element to split off a portion of the return light travelling back from the measurement-subject article and passing through the convex lens, and then direct the split-off light onto the second screen.

In this case, the split-off light projected onto the second screen comes from the return light before the deflection thereof is increased by the concave lens and so on. Hence, even when the inclination (deflection) of the normal of the measurement-subject article is large, there is next to no chance that the light spot of the split-off light split off the return light will fall outside the second screen.

Thus, even if the light spot of the return light falls outside the first screen, by visually verifying the light spot shown on the second screen, the operator is able to detect the direction of the inclination (deflection) of the normal of the measurement-subject article.

In this manner, it is possible for the operator to follows the light spot of the split-off light on the second screen to make a coarse adjustment to the inclination (deflection) of the normal of the measurement-subject article, and after the light spot of the return light is projected onto the first screen, to follow the light spot on the first screen to make a fine adjustment to the inclination (deflection) of the measurement-subject article, in order to make tests, checks, adjustments and the like to the measurement-subject articles with high precision and ease.

These and other objects and features of the present invention will become more apparent from the following detailed description with reference to the accompanying drawings.

BRIEF DESCRIPTION OF THE DRAWINGS

FIG. 2 is a block diagram illustrating a first embodiment of an auto-collimator according to the present invention.

FIG. 3 is a block diagram illustrating a second embodiment of an auto-collimator according to the present invention.

DETAILED DESCRIPTION OF THE PREFERRED EMBODIMENTS

Figure 1:
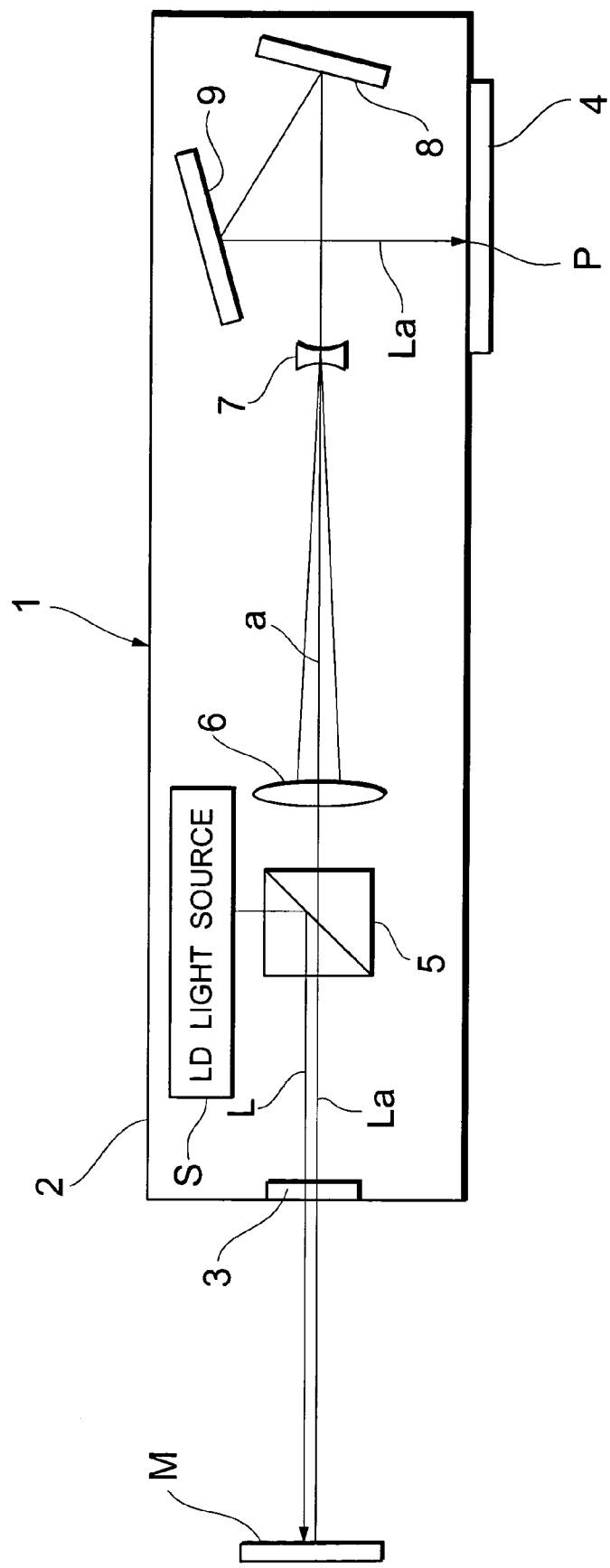
FIG. 1 is a schematic block diagram of the structure of a conventional auto-collimator.

Preferred embodiments of the present invention will be described below in detail with reference to the accompanying drawings.

FIG. 2 is a schematic block diagram showing a first embodiment of the auto-collimator according to the present invention.

In FIG. 2, the auto-collimator 10 has a cover glass 12 fitted into an opening formed in the face at one end (the left-hand end in FIG. 2) of an approximately box-shaped casing 11, and a fine-adjustment verification screen 13 mounted to another opening formed in a side face close to the other end (the right-hand end in FIG. 2) of the casing 11.

The casing 11 houses a beam splitter 14, a convex lens 15 and a concave lens 16 fixed in this order from the cover glass 12 in mutually coaxial positions along an axis a1 parallel to the axis of the casing 11.

The concave lens 16 is situated in a position corresponding to the focal point of the convex lens 15.

A first reflection mirror 17 is fixed in a position intersecting with the axis a1 in the end portion of the casing 11 in the proximity of the fine-adjustment verification screen 13, in such a way that the normal of the first reflection mirror 17 is inclined toward the opposite side from the fine-adjustment verification screen 13 with respect to the axis a1. Further, a second reflection mirror 18 is fixed opposite to the fine-adjustment verification screen 13 in such a way as to be inclined toward the first reflection mirror 17 with respect to the normal of the fine-adjustment verification screen 13.

The inclination angles of the normals of the first reflection mirror 17 and the second reflection mirror 18 are set respectively at angles allowing the light passing from the cover glass 12 through the beam splitter 14, convex lens 15 and concave lens 16 to be reflected by the first reflection mirror 17 and the second reflection mirror 18 so as to enter the fine-adjustment verification screen 13, which will be described later.

A light source S1 having a laser diode is mounted opposite the beam splitter 14 inside the casing 11 and oriented to apply a laser beam L1 onto the beam splitter 14.

The foregoing structure is approximately similar to that in the conventional auto-collimator 1 shown in FIG. 1.

The auto-collimator 10 is further provided with a beam splitter 19 fixed in a predetermined position between, and coaxial with, the convex lens 15 and the concave lens 16.

The beam splitter 19 is opposite a coarse-adjustment verification screen 20 that is mounted on the same side face of the casing 11 as that on which the fine-adjustment verification screen 13 is mounted (therefore, in a position closer to the left-hand end of the casing 11 than the position of the fine-adjustment verification screen 13 with regard to the left-hand end).

The beam splitter 19 is positioned such that a reflection face 19a thereof reflects a portion of the return light L1a passing through the convex lens 15 toward the coarse-adjustment verification screen 20 and the distance s1 between the reflection face 19a and the concave lens 16 is equal to the distance s2 between the reflection face 19a and the coarse-adjustment verification screen 20.

As in the case of the auto-collimator 1 shown in FIG. 1, in the auto-collimator 10, a laser beam L1 emitted from the light source S1 is reflected at right angles by the beam splitter 14, and then passes through the cover glass 12 to be irradiated onto a measurement-subject article M.

The measurement-subject article M reflects the laser beam L1 to produce a return light L1a which passes through the cover glass 12 to the inside of the casing 11. The return light L1a passes through the beam splitter 14, is then concentrated by the convex lens 15 and is then converted to parallel light by the concave lens 16.

When the normal of the measurement-subject article M is inclined (i.e. deflection occurs), the return light L1a is deflected. When this return light L1a is converted to parallel light by the concave lens 16, the deflection is increase.

Then the return light L1a passing through the concave lens 16 is reflected by the first reflection mirror 17 and then the second reflection mirror 18, and then is projected onto the fine-adjustment verification screen 13.

The fine-adjustment verification screen 13 displays the center point and a scale showing the degree of deflection from the center point. This center point is set at a light spot P1 produced by the return light L1a when there is no deflection on the normal of the measurement-subject article M.

Accordingly, when deflection occurs in the normal of the measurement-subject article M due to mounting conditions or the like, the light spot P1 of the return light L1a is shown in a position deviating from the center point on the fine-adjustment verification screen 13, to enable the operator to detect the deflection of the normal of the measurement-subject article M.

The auto-collimator 10 uses two mirrors, the first reflection mirror 17 and the second reflection mirror 18, to extend the light path of the return light L1a from the concave lens 16 to the fine-adjustment verification screen 13 as compared with the case where the return light L1a directly enters the verification screen from the concave lens 16. Hence, the deflection of the return light L1a is further increased. As a result, it is possible to make a fine adjustment to the mounting conditions of the measurement-subject article M with high accuracy.

In the auto-collimator 10, a portion L1b of the return light L1a passing through the convex lens 15 is reflected by the beam splitter 19 so as to be projected onto the coarse-adjustment verification screen 20.

In this case, the distance s1 between the concave lens 16 and the reflection face 19a of the beam splitter 19 is equal to the distance s2 between the coarse-adjustment verification screen 20 and the reflection face 19a. For this reason, the portion (split-off light) L1b of the return light L1a which has been reflected by the reflection face 19a of the beam splitter 19 for projection onto the coarse-adjustment verification screen 20 comes into focus on the coarse-adjustment verification screen 20, so that a clear light spot P2 is shown on the coarse-adjustment verification screen 20.

The split-off light L1b of the return light L1a shown on the coarse-adjustment verification screen 20 comes from the return light L1a before the deflection thereof is increased by the concave lens 16, the first reflection mirror 17 and the second reflection mirror 18. For this reason, even in the case of a large deflection of the normal of the measurement-subject article M, the light spot P2 of the split-off light L1b of the return light L1a will fall within the coarse-adjustment verification screen 20 in the great majority of cases.

Accordingly, even if the light spot P1 of the return light L1a falls outside the fine-adjustment verification screen 13, the operator is able to visually verify the light spot P2 shown on the coarse-adjustment verification screen 20 for recognition of the direction of the deflection of the normal of the measurement-subject article M.

The operator then follows the light spot P2 on the coarse-adjustment verification screen 20 to make a coarse adjustment to the measurement-subject article M with regard to the mounting conditions or the like. After the light spot P1 of the return light L1a is projected onto the fine-adjustment verification screen 13, the operator follows the light spot P1 on the fine-adjustment verification screen 13 to make a fine adjustment to the measurement-subject article M with regard to the mounting conditions or the like. As a result, it is possible to make tests, checks, adjustments and the like to the measurement-subject articles M with high precision and ease.

FIG. 3 is a schematic block diagram illustrating a second embodiment of the auto-collimator according to the present invention.

The auto-collimator 30 of the second embodiment has a cover glass 12 fitted into an opening formed in the face of one end (the left-hand end in FIG. 3) of an approximate box shaped casing 11, and a fine-adjustment verification screen 13 attached to another opening formed in a side face close to the other end (the right-hand end in FIG. 3) of the casing 11.

The casing 11 houses a beam splitter 14, a convex lens 15 and a concave lens 16 fixed in this order from the cover glass 12 in mutually coaxial positions along an axis a1 parallel to the axis of the casing 11.

The concave lens 16 is situated in a position corresponding to the focal point of the convex lens 15.

A first reflection mirror 17 is fixed in a position intersecting with the axis a1 in the end portion of the casing 11 in the proximity of the fine-adjustment verification screen 13, in such a way that the normal of the first reflection mirror 17 is inclined toward the opposite side from the fine-adjustment verification screen 13 with respect to the axis a1. Further, a second reflection mirror 18 is fixed opposite to the fine-adjustment verification screen 13 in such a way as to be inclined toward the first reflection mirror 17 with respect to the normal of the fine-adjustment verification screen 13.

The inclination angles of the normals of the first reflection mirror 17 and the second reflection mirror 18 are set respectively at angles allowing the light passing from the cover glass 12 through the beam splitter 14, convex lens 15 and concave lens 16 to be reflected by the first reflection mirror 17 and the second reflection mirror 18 so as to enter the fine-adjustment verification screen 13.

A light source S1 having a laser diode is mounted opposite the beam splitter 14 inside the casing 11 and oriented to apply a laser beam L2 onto the beam splitter 14.

The foregoing structure is the same as that in the auto-collimator 10 shown in FIG. 2, and the same reference numerals are designated.

The auto-collimator 30 is further provided with a beam splitter 31 fixed in a predetermined position between, and coaxial with, the convex lens 15 and the concave lens 16.

The beam splitter 31 includes a reflection face 31a oriented in the direction opposite to that of the beam splitter 19 in the first embodiment, in which a portion L2b of the return light L2a produced when the laser beam L2 emitted from the light source S1 is reflected by the measurement-subject article M is reflected toward the side face of the casing 11 opposite to the side face on which the fine-adjustment verification screen 13 is mounted.

Alongside the side of the beam splitter 31 toward which the portion (split-off light) L2b of the return light L2a is reflected (i.e. the side of the casing 11 opposite to the side face on which the fine-adjustment verification screen 13 is mounted), a reflection mirror 32 is mounted in an orientation parallel to the axis a1.

A coarse-adjustment verification screen 33 is mounted opposite to the beam splitter 31 on the same side face of the casing 11 as that on which the fine-adjustment verification screen 13 is mounted.

The mounting position of the beam splitter 31 is determined in such a manner that a distance s3 between the reflection face 31a and the concave lens 16 becomes equal to the sum of a distance s4 between the reflection face 31a and the reflection mirror 32 and a distance s5 between the reflection mirror 32 and the coarse-adjustment verification screen 33 (i.e. s3=s4+s5).

As in the case of the auto-collimator 1 shown in FIG. 1, in the auto-collimator 30, a laser beam L2 emitted from the light source S1 is reflected at right angles by the beam splitter 14, and then passes through the cover glass 12 to be irradiated onto a measurement-subject article M.

The measurement-subject article M reflects the laser beam L2 to produce a return light L2a which passes through the cover glass 12 to the inside of the casing 11. The return light L2a passing through the beam splitter 14 is concentrated by the convex lens 15, and is then converted to parallel light by the concave lens 16.

When the normal of the measurement-subject article M is inclined (i.e. deflection occurs), the return light L2a is deflected. When this return light L2a is converted to parallel light by the concave lens 16, the deflection is increased.

Then the return light L2a passing through the concave lens 16 is reflected by the first reflection mirror 17 and the second reflection mirror 18, and then is projected onto the fine-adjustment verification screen 13.

The fine-adjustment verification screen 13 displays the center point and a scale showing the degree of deflection from the center point. This center point is set at a light spot P3 produced by the return light L2a when there is no deflection on the normal of the measurement-subject article M.

Accordingly, when deflection occurs in the normal of the measurement-subject article M due to mounting conditions or the like, the light spot P3 of the return light L2a is shown in a position deviating from the center point of the fine-adjustment verification screen 13, to enable the operator to detect the deflection of the normal of the measurement-subject article M.

The auto-collimator 30 uses two mirrors, the first reflection mirror 17 and the second reflection mirror 18, to extend the light path of the return light L2a from the concave lens 16 to the fine-adjustment verification screen 13 as compared with the case where the return light L2a directly enters the verification screen from the concave lens 16. Hence, the deflection of the return light L2a is further increased. As a result, it is possible to make a fine adjustment to the measurement-subject article M with regard to the mounting conditions with high accuracy.

In the auto-collimator 30, a portion L2b of the return light L2a passing through the convex lens 15 is reflected by the reflection face 31a of the beam splitter 31 toward the reflection mirror 32, then reflected by the reflection mirror 32 to pass through the beam splitter 31, and then projected onto the coarse-adjustment verification screen 33.

In this case, the distance s3 between the reflection face 31a of the beam splitter 31 and the concave lens 16 is equal to the sum of the distance s4 between the reflection face 31a and the reflection mirror 32 and the distance s5 between the reflection mirror 32 and the coarse-adjustment verification screen 33 (s3=s4+s5). For this reason, the light path from the reflection face 31a of the beam splitter 31 to the concave lens 16 is identical in length to the light path from the reflection face 31a to the coarse-adjustment verification screen 33. Hence, the portion L2b of the return light L2a which will be projected onto the coarse-adjustment verification screen 33 comes into focus on the coarse-adjustment verification screen 33, resulting in a clarity of the light spot P4.

The split-off light L2b of the return light L2a shown on the coarse-adjustment verification screen 33 comes from the return light L2a before the deflection thereof is increased by the concave lens 16, the first reflection mirror 17 and the second reflection mirror 18. For this reason, even in the case of a large deflection of the normal of the measurement-subject article M, the light spot P4 of the split-off light L2b of the return light L2a will fall within the coarse-adjustment verification screen 33 in the great majority of cases.

Accordingly, even if the light spot P3 of the return light L2a falls outside the fine-adjustment verification screen 13, the operator is able to visually verify the light spot P4 of the split-off light L2b shown on the coarse-adjustment verification screen 33 for recognition of the direction of the deflection of the normal of the measurement-subject article M.

Then the operator follows the light spot P4 of the split-off light L2b on the coarse-adjustment verification screen 33 to make a coarse adjustment to the measurement-subject article M with regard to the mounting conditions and the like. After the light spot P3 of the return light L2a is projected onto the fine-adjustment verification screen 13, the operator follows the light spot P3 on the fine-adjustment verification screen 13 to make a fine adjustment to the measurement-subject article M with regard to the mounting conditions and the like. As a result, it is possible to make tests, checks, adjustments and the like to the measurement-subject articles M with high precision and ease.

In the auto-collimator 30, the return light L2a is reflected twice by the first reflection mirror 17 and the second reflection mirror 18 before reaching the fine-adjustment verification screen 13, and also the split-off light L2b of the return light L2a is reflected twice by the reflection face 31a of the beam splitter 31 and the reflection mirror 32 before reaching the coarse-adjustment verification screen 33. As a result, there occurs a match between the direction of deflection of the normal of the measurement-subject article M displayed by the light spot P3 on the fine-adjustment verification screen 13 and the direction of deflection displayed by the light spot P4 on the coarse-adjustment verification screen 33.

Thus, as compared with the auto-collimator 10 in the first embodiment, the auto-collimator 30 enables easy detection and adjustment of the deflection of the measurement-subject article M while observing the light spots P3 and P4 respectively displayed in the same direction on the fine-adjustment verification screen 13 and the coarse-adjustment verification screen 33 in correspondence with the deflection of the normal of the measurement-subject article M.

Each of the first and second embodiments has described an auto-collimator based on the superordinate idea that the auto-collimator, which applies light from a light source onto a measurement-subject article, then concentrates the return light reflected back from the measurement-subject article by a convex lens, then converts the return light to parallel light by a concave lens, and then projects the return light onto a first screen for detection of inclination of the normal of the measurement-subject article, includes an optical splitting element provided between the convex lens and the concave lens for splitting off a portion of the return light travelling back from the measurement-subject article, and a second screen for projecting the split-off light split off by the optical splitting element.

In an auto-collimator based on this superordinate idea, the light emitted from the light source is irradiated onto the measurement-subject article. The return light reflected from the measurement-subject article is concentrated by the convex lens, is then converted to parallel light by the concave lens, and then enters the first screen.

In this case, if the normal of the measurement-subject article is inclined, the return light is deflected. Therefore, when this return light is converted to the parallel light by the concave lens, the deflection is increased.

For this reason, a light spot of the return light projected onto the first screen after passing through the concave lens is shown in a position deviating from a position of a light spot projected on the first screen when the return light is not deflected, in correspondence with the degree of inclination of the normal of the measurement-subject article.

Accordingly the operator is able to visually verify the position of the light spot of the return light on the first screen for detection of the inclination (deflection) of the normal of the measurement-subject article.

In this case, the light spot shown on the first screen is produced from the return light having the increased deflection. Therefore, it is possible to detect and fine-adjust the inclination of the normal of the measurement-subject article with accuracy.

The auto-collimator further uses the optical splitting element to split off a portion of the return light travelling back from the measurement-subject article and passing through the convex lens, and then direct the split-off light onto the second screen.

In this case, the split-off light projected onto the second screen comes from the return light before the deflection thereof is increased by the concave lens and so on. Hence, even when the inclination (deflection) of the normal of the measurement-subject article is large, there is next to no chance that the light spot of the split-off light from the return light will fall outside the second screen.

Thus, even if the light spot of the return light falls outside the first screen, by visually verifying the light spot shown on the second screen, the operator is able to detect the direction of the inclination (deflection) of the normal of the measurement-subject article.

In this manner, it is possible for the operator to follow the light spot of the split-off light on the second screen to make a coarse adjustment to the inclination (deflection) of the normal of the measurement-subject article, and after the light spot of the return light is projected onto the first screen, to follow the light spot on the first screen to make a fine adjustment to the inclination (deflection) of the measurement-subject article, in order to make tests, checks, adjustments and the like to the measurement-subject articles with high precision and ease.

The terms and description used herein are set forth by way of illustration only and are not meant as limitations. Those skilled in the art will recognize that numerous variations are possible within the spirit and scope of the invention as defined in the following claims.

What is claimed is:

1. An auto-collimator applying light from a light source onto a measurement-subject article, then concentrating the return light reflected back from the measurement-subject article by a convex lens, then converting the return light to parallel light by a concave lens, and then projecting the return light onto a first screen for detection of inclination of the normal of the measurement-subject article, said auto-collimator comprising:
    an optical splitting element provided between the convex lens and the concave lens for splitting off a portion of the return light travelling back from the measurement-subject article; and
    a second screen for projecting the split-off light split off by the optical splitting element.

2. An auto-collimator according to claim 1, wherein the optical splitting element is a beam splitter.

3. An auto-collimator according to claim 1, wherein the optical splitting element is positioned at an approximately equal distance from the concave lens and from the second screen.

4. An auto-collimator according to claim 1, further comprising a plurality of reflection mirrors for reflecting in sequence the return light travelling back from the measurement-subject article and passing through the concave lens, wherein the return light travelling back from the measurement-subject article is reflected by the plurality of reflection mirrors and then enters the first screen.

5. An auto-collimator according to claim 4, further comprising a reflection mirror for reflecting the split-off light split off from the return light travelling back from the measurement-subject article by the optical splitting element, wherein the split-off light split off from the return light is reflected by the reflection mirror and then enters the second screen.

6. An auto-collimator according to claim 1, wherein the optical splitting element is located in a position to allow a space between the optical splitting element and the concave lens to be identical in length with the sum of a space between the optical splitting element and a reflection mirror provided for reflecting the split-off light travelling from the optical splitting element and a space between the reflection mirror for reflecting the split-off light and the second screen.

7. An auto-collimator according to claim 1, further comprising:
    two reflection mirrors for reflecting in sequence the return light travelling back from the measurement-subject article and passing through the concave lens for projection onto the first screen; and
    a single reflection mirror for reflecting the split-off light split off from the return light travelling back from the measurement-subject article by the optical splitting element, for projection onto the second screen.

* * * * *